Patented Mar. 13, 1934

1,950,662

UNITED STATES PATENT OFFICE 1,950,662

COATED ARTICLE AND METHOD OF PREPARING THE SAME

Camille Dreyfus, New York, N. Y.

No Drawing. Application March 23, 1928,
Serial No. 264,282

8 Claims. (Cl. 91—68)

This invention relates to the coating of foraminous material with a transparent film having a preponderance of cellulose acetate or organic derivatives of cellulose to produce transparent or translucent material that may be used as a glass substitute.

An object of my invention is to produce flexible glass substitute that is strong and resistant to weathering.

A further object of my invention is to produce a glass substitute by coating a wire screen with a coating composition containing resins of the polymerized vinyl compound type so as to afford greater protection to the metallic screen against oxidation or rusting. Other objects of my invention will appear from the following detailed description.

One of the forms of glass substitute as made at present consists of a wire netting coated with a cellulose acetate film. The small films filling the meshes of the netting form a large number of minute panes of "flexible glass" which allow a larger proportion of ultra-violet light to pass through than ordinary glass, and the whole forms a flexible and not easily broken substitute for glass. However, when this material is exposed to the effect of the weather, as in many of its applications, moisture penetrates through the film to the wire and this, in time, rusts and thereafter a rapid deterioration of the netting occurs.

I have found that protective films or coatings prepared from lacquers containing organic derivatives of cellulose, such as cellulose acetate, and resins formed by polymerized vinyl compounds are more useful as protective coatings than lacquer made from cellulose acetate without the addition of the said resins.

I have also found that if the netting is given a protective coating of a film of the said resins, such coating being sufficient to cover the wire but not sufficient to fill the spaces between the wire, it may then be given a second coating of organic derivatives of cellulose, such as cellulose acetate and the spaces thereby filled in. The flexible glass produced in this way has also superior weather resistance, the protective action of the resins being in this way concentrated around the wire which it is desired to prevent from rusting or oxidation.

In accordance with my invention, I coat a foraminous material with a coating composition containing a polymerized vinyl compound resin. In one form of my invention, the foraminous material is given merely a light coat of the coating composition that contains the vinyl resin so that the interstices or meshes are not completely closed, and then a further coat of coating composition which contains organic derivatives, with or without vinyl resins, is applied in sufficient quantity to close the meshes. In another form of my invention, sufficient coating composition containing both organic derivatives of cellulose and vinyl resin is applied in sufficient quantities to entirely close the meshes of the foraminous material.

The foraminous material treated in accordance with my invention may be of any suitable character such as screen, gauze, fabric or the like, and may be made of any suitable material such as metal or animal or vegetable fibres. While copper or galvanized iron or steel screen may be used, the greatest advantages are obtained by the use of iron or steel wire screen without any previous treatment, since this material is cheapest, and is protected against rusting by the coating composition containing the vinyl resin.

As stated before, the coating composition that comes in direct contact with the wire of the screen should contain a resin of the polymerized vinyl compound type. Any suitable vinyl compound that is, a compound having the group $CH_2=CH$ therein, may be used for making the polymerized product to be employed in my invention. Of the vinyl compounds that may be used, I prefer the vinyl acetate but it is to be understood that other vinyl compounds, such as the compound formed by dehalogenating a vinyl halide by means of zinc dust, vinyl propionate, vinyl phosphate, vinyl chloride etc. may be used. The vinyl compound may be polymerized by sunlight, by ultra-violet light, such as is emitted from a mercury vapor lamp, or in any suitable manner. Catalytic assistants such as uranium salts, carbon tetrachloride, etc. may be employed, although their use is not required for polymerizing many vinyl compounds, e. g. vinyl acetate. Heat may be employed to accelerate the polymerization of the vinyl compounds while they are exposed to light; or after initiation of the polymerization, the source of light may be removed and polymerization caused to proceed solely by the use of heat. The degree to which the vinyl compound is polymerized may be varied to suit the requirements of the operator. Thus the vinyl compound may be only partially polymerized to a jelly like consistency prior to addition to the coating composition, and further polymerization of the vinyl compound effected in the coating composition or after application of the same to the wire screen. On the other hand, the vinyl compound may be polymerized to a solid or resin state, care, however, being taken that the polymerization be not carried to the point where a hard product that is insoluble in organic solvents is formed. While the vinyl compounds are preferably at least partially polymerized prior to their addition to the coating composition, the unpolymerized vinyl compound may be added to the coating composition, and the coating composition containing the same exposed to such conditions as to polymerize the vinyl compounds. This polymerization of the vinyl compounds may be wholly effected while in solution in the coating composition or only partially so, the remaining required polymerization taking place after application to the screen.

The polymerized vinyl compounds above described, and particularly those formed from vinyl acetate, are compatible with cellulose derivatives and particularly cellulose acetate, and form homogeneous and clear solutions with them, which do not precipitate out either in the solution or in the films formed therefrom.

The coating composition containing the vinyl resin, if it is applied only in sufficient quantities to coat the wire but in insufficient quantities to close the mesh of the foraminous material, may or may not contain organic derivatives of cellulose. If it is used to close the meshes of the screen, it should contain organic derivatives of cellulose. Examples of organic derivatives of cellulose are organic esters such as cellulose acetate, cellulose formate, cellulose propionate and cellulose butryate; and cellulose ethers such as ethyl cellulose, methyl cellulose and benzyl cellulose.

The coating composition may or may not contain suitable plastifiers or softeners such as diethyl phthalate, tricresyl phosphate, triphenyl phosphate, various amides such as mono methyl toluene sulfonamid, triacetin, diphenylol propane, thio carbanilid etc. The coating composition also may or may not contain natural gums or resins or semi synthetic resins such as manila, accaroides, pontianak, kauri, dammar, rosin, shellac or ester gum (glycerol ester of rosin). The coating composition may contain medium and/or high boiling solvents such as ethyl acetate, ethyl lactate, tetrachlorethane, benzyl alcohol or diacetone alcohol. Of the volatile solvents that may be used in the coating composition the following may be mentioned: acetone, alcohol (ethyl or methyl) benzene, toluene or ethylene dichloride.

In case the coating composition containing the polymerized vinyl compound resin is applied in quantities that are not sufficient to close the meshes or interstices of the foraminous material, the coating composition that is applied to close the meshes will contain the organic derivatives of cellulose, but need not necessarily contain polymerized vinyl resins.

In order to further explain my invention but without limiting myself to the specific details thereof, the following examples are given.

*Example I*

The following examples are given for preparing the flexible glass substitute in accordance with the first form of my invention, i. e. the application of the coating composition in two steps, wherein the first coat contains the vinyl compound resin.

An iron or steel screen containing for instance 14 meshes per inch is dipped in a solution containing a polymerized vinyl compound resin which may be of either of the following solutions.

|  | Parts |
|---|---|
| A—Polymerized vinyl acetate | 10 |
| Low boiling solvent | 100 |
| B—Polymerized vinyl acetate | 8 |
| Diethyl phthalate | 2 |
| Low boiling solvent | 100 |
| Ethyl lactate | 5 |

After dipping the solution is allowed to drain off the screen so that the meshes thereof are not filled in. The screen is then dried and is then preferably exposed to such conditions (such as to light and/or heat) that the vinyl compounds are polymerized to such an extent, that the resins are formed that are not soluble in the solvent mixtures that are used in the coating composition that is used for the second dipping. The screen is then dipped in a second solution containing organic derivatives of cellulose of which the following are examples.

|  | Parts |
|---|---|
| A—Cellulose acetate | 10 |
| Acetone | 100 |
| B—Cellulose acetate | 5 |
| Acetone | 50 |
| Alcohol | 25 |
| Benzene | 25 |
| Ethyl lactate | 2 |
| C—Cellulose acetate | 15 |
| Diethyl phthalate | 1 |
| Tricresyl phosphate | 1 |
| Triphenyl phosphate | 1 |
| Triacetin | 1 |
| Acetone | 100 |

The meshes of the wire are closed by these solutions to form the finished flexible glass substitute after drying.

*Example II*

The following examples are given for preparing the flexible glass substitute in accordance with the second form of my invention, i. e. the application of the coating composition containing both the polymerized vinyl compound resin and the organic derivative of cellulose throughout the entire process.

The wire screen is dipped in either of the following solutions:

|  | Parts |
|---|---|
| A—Cellulose acetate | 10 |
| Polymerized vinyl acetate resin | 2 |
| Acetone | 100 |
| B—Cellulose acetate | 10 |
| Polymerized vinyl acetate resin | 5 |
| Diethyl phthalate | 3 |
| Acetone | 100 |
| Ethyl lactate | 2 |

The meshes of the screen are entirely closed by the film produced from either of the above coating compositions.

If desired any suitable pigments, dyes, powdered metal, etc. may be added either to produce artistic or colored effects or for the further protection of the wire, the said additions being made either in the first, second or both solutions when two dippings are given.

Obviously other methods of coating the screen may be used. Thus instead of dipping the screen in a coating bath by a batch process, the screen may have the solution applied thereto by spraying, brushing and dipping in a continuous manner, and then passed continuously over a heating table or through a drier or other suitable apparatus.

It is to be understood that the foregoing details are given merely by way of illustration and that many variations may be made therein without departing from the spirit of this invention.

Having described my invention, what I claim and desire to secure by Letters Patent is:

1. The method of coating a metallic screen comprising applying a coating composition containing a vinyl compound to the same in quantities insufficient to close the meshes thereof and then applying a coating composition containing an organic derivative of cellulose in quantities sufficient to close said meshes.

2. The method of coating a metallic screen comprising applying a coating composition containing a vinyl compound to the same in quantities insufficient to close the meshes thereof and then applying a coating composition containing cellulose acetate in quantities sufficient to close said meshes.

3. The method of coating a metallic screen comprising applying a coating composition containing an at least partially polymerized vinyl compound to the same in quantities insufficient to close the meshes thereof and then applying a coating composition containing organic derivatives of cellulose in quantities sufficient to close said meshes.

4. The method of coating a metallic screen comprising applying a coating composition containing an at least partially polymerized vinyl compound to the same in quantities insufficient to close the meshes thereof and then applying a coating composition containing cellulose acetate in quantities sufficient to close said meshes.

5. A foraminous material having its strands immediately coated with a vinyl compound and its meshes closed with an organic derivative of cellulose composition.

6. A foraminous material having its strands immediately coated with a vinyl compound and its meshes closed with a cellulose acetate composition.

7. A foraminous material having its strands immediately coated with an at least partially polymerized vinyl compound and its meshes closed with an organic derivative of cellulose composition.

8. A foraminous material having its strands immediately coated with an at least partially polymerized vinyl compound and its meshes closed with a cellulose acetate composition.

CAMILLE DREYFUS.